Dec. 12, 1939.                L. GOLDHAMMER                2,183,068
                            MOTION PICTURE CAMERA
                            Filed April 7, 1938
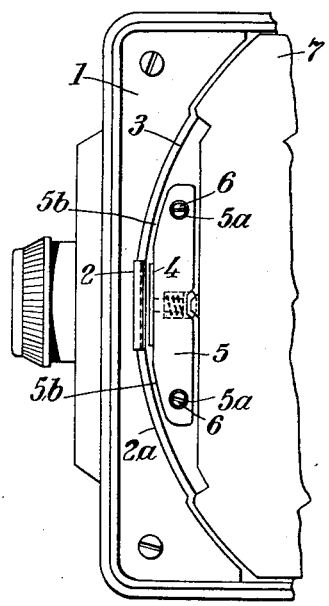
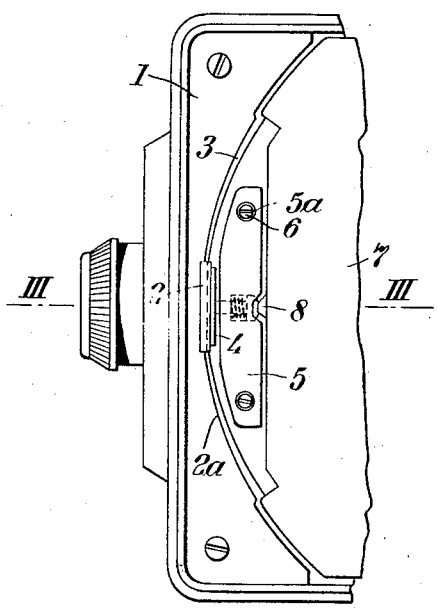
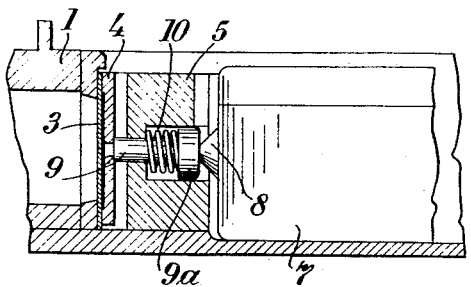
Inventor
Leo Goldhammer
By His Attorney Patented Dec. 12, 1939

2,183,068

UNITED STATES PATENT OFFICE 2,183,068

MOTION PICTURE CAMERA

Leo Goldhammer, Munich, Germany, assignor, by mesne assignments, to Agfa Ansco Corporation, Binghamton, N. Y., a corporation of Delaware Application April 7, 1938, Serial No. 200,713
In Germany April 8, 1937

5 Claims. (Cl. 88—17)

The present invention relates to motion picture cameras and more particularly to the adaptation of such cameras for use with special film magazines which co-operate therewith.

Motion picture cameras are known the pressure plate of which is adapted to be automatically pressed against the film in locking the cover of the camera. These cameras are not advantageous because it is not possible for the photographer to know whether the magazine or the film is correctly inserted in the camera and the driving mechanism works in faultless manner.

It is an object of the present invention to provide simple and practical means for overcoming these disadvantages.

Another object is the provision of means which facilitate the inserting of the film and render it feasible for the photographer to control the readiness of the camera for working while the cover of the camera is opened.

A further object is the provision of means which if the magazine is positioned in the motion picture camera co-operate in such a manner that the pressure plate is pressed on the film against the action of a spring.

A still further object is to provide a magazine with a conical extension which if the magazine is positioned in the apparatus comes in contact with the pressure plate and locks the film channel.

Yet another object is to provide an interchangeable holding and guide member for the film pressure plate, the holding member and the pressure plate may be taken up for the purpose of cleaning the film channel.

Other objects and advantages of the invention will appear from the detailed description following hereinafter.

Reference is made to the accompanying drawing in which:

Figure 1 shows a side view of the front part of a motion picture camera in accordance with the invention before the film channel is locked, the cover of the camera being opened;

Figure 2 shows a side view of the front part of the camera after the magazine has been inserted and the film channel is locked;

Figure 3 shows a horizontal sectional view of the film channel taken along the line III—III of Figure 2.

I designates the motion picture camera. The film 3 is pressed against the central piece 2 of the curved stationary film guiding portion 2a by the pressure plate 4. This plate is carried by an interchangeable guide and bearing member 5 which has two apertures 5a into which pins 6 project. These pins are mounted on the camera. The plate holder 5 is formed corresponding to the curved guiding portion 2a so that the film band 3 is guided channel-like on the one hand by the portion 2a and on the other hand by the curved front wall 5b of the holder 5.

In accordance with the invention the film magazine 7 is equipped with a conical pin 8. The bolt 9 attached to the pressure plate 4 is subjected to the action of a spring 10 which is capable of keeping the button 9a and therewith the pressure plate 4 in a certain distance from the film band 3. If the magazine has been inserted in the camera, the extension 8 presses against the button 9a and the pressure plate 4 against the film 3 so that the film channel is automatically locked (see Figure 2). The film band is advantageously inserted in the open film channel (see Figure 1) and the magazine is then positioned in the apparatus whereby the film channel is locked.

I claim:

1. A photographic camera having a casing and an objective, a film channel in said casing defining a path for the movement of film past said objective, a pressure plate in said casing adapted to engage a film in said path, a spring normally urging said plate out of film engaging position, and means on said plate engageable by a film magazine when placed in said casing to move said plate into film engaging position against the tension of said spring.

2. A photographic camera having a casing and an objective, a film channel in said casing defining a path for the movement of film past said objective, said film channel comprising a stationary curved film guiding portion and an interchangeable correspondingly curved support, a pressure plate on said support adapted to engage a film in said path, a spring normally urging said plate out of film engaging position, and means on said plate engageable by a film magazine when placed in said casing to move said plate into film engaging position against the tension of said spring.

3. A photographic camera having a casing and an objective, a film channel in said casing defining a path for the movement of film past said objective, a pressure plate in said casing adapted to engage a film in said path, a spring normally urging said plate out of film engaging position, means fixed to said plate and means on said magazine adapted to engage said plate means when said magazine is placed in said casing, whereby said plate is forced into film engaging position against the tension of said spring.

4. A photographic camera having a casing and an objective, a film channel in said casing defining a path for the movement of film past said objective, said film channel comprising a film guiding portion and an interchangeable support having apertures therein, corresponding pins on said casing, the apertured support being removably mounted on said pins, a pressure plate on said support adapted to engage a film in said path, a spring normally urging said plate out of film engaging position, means fixed to said plate and slidable in said support, and means on said magazine adapted to engage said slidable means when said magazine is placed in said casing, whereby said plate is forced into film engaging position against the tension of said spring.

5. A photographic camera having a casing and an objective, a film channel in said casing defining a path for the movement of film past said objective, said film channel comprising a stationary curved film guiding portion and an interchangeable correspondingly curved support having apertures therein, corresponding pins attached to said casing, the apertured support being removably mounted on said pins, a pressure plate on said interchangeable support adapted to engage a film in said path, a spring normally urging said plate out of film engaging position, bolt-like means fixed to said plate and slidable in said support, and projecting means on said magazine adapted to engage said bolt-like means when said magazine is placed in said casing, whereby said plate is forced into film engaging position against the tension of said spring.

LEO GOLDHAMMER.